Nov. 20, 1928.
L. HACHENBERG
1,692,036
WINDOW CLEANING DEVICE
Filed April 9, 1927
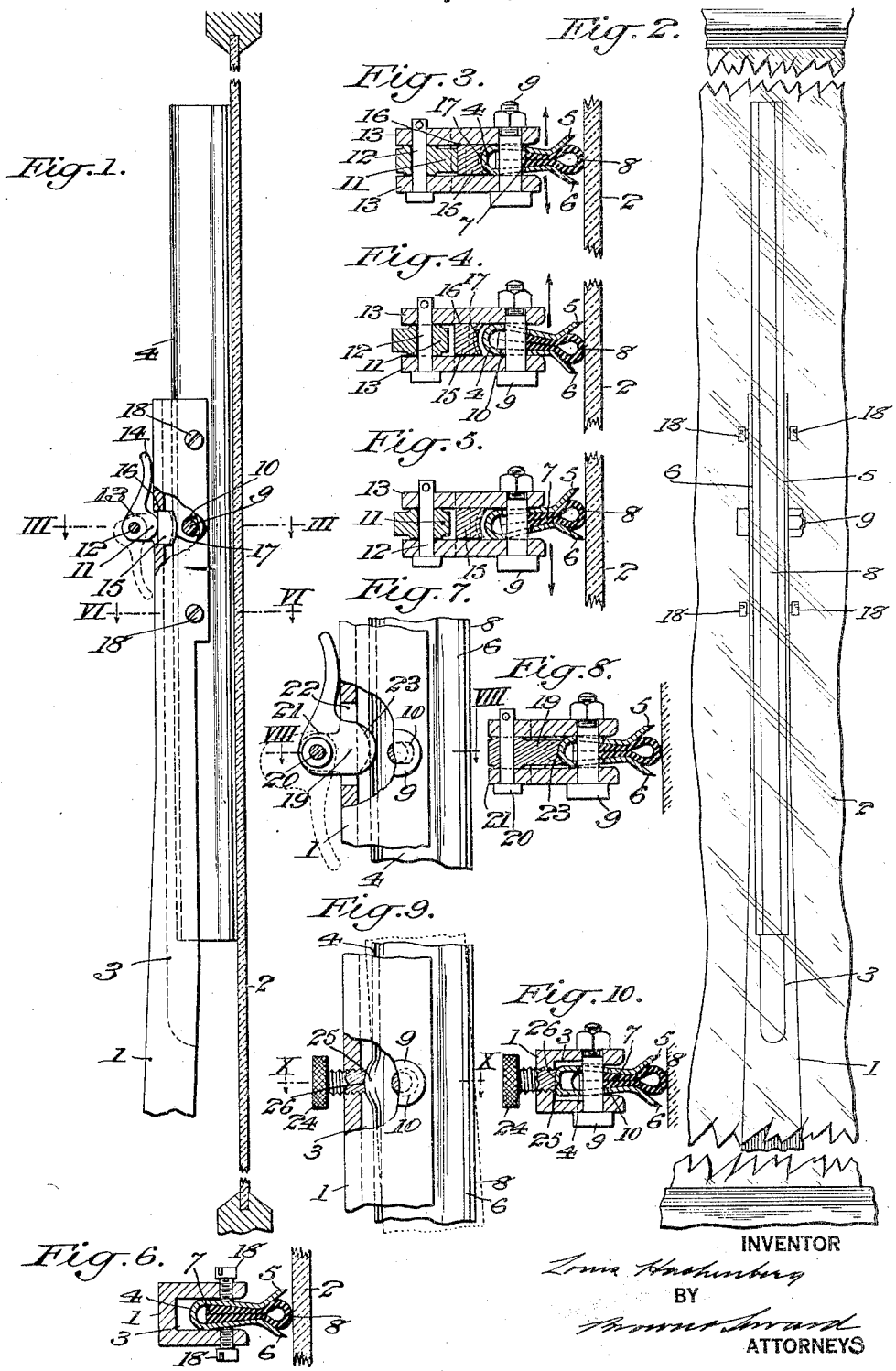
INVENTOR
BY
ATTORNEYS Patented Nov. 20, 1928.

1,692,036

UNITED STATES PATENT OFFICE.

LOUIS HACHENBERG, OF THROGGS NECK, NEW YORK, ASSIGNOR OF ONE-HALF TO WILLIAM BRADY, OF OSSINING, NEW YORK.

WINDOW-CLEANING DEVICE.

Application filed April 9, 1927. Serial No. 182,353.

This invention relates to an improvement in window cleaning devices, and more particularly to the cleaning element which is brought into contact with the window glass.

It has for its object to provide a device which combines a plurality of scraping means for cleaning sleet and ice from the window glass, and a resilient wiper for removing the moisture from the glass, one of which scraping means is arranged to be brought into contact with the glass and perform its function in advance of the wiper as the device is actuated on the window glass.

Another object is to provide means for mounting the device in its actuating arm so that the device may be moved bodily on its longitudinal axis and also on its transverse axis, whereby the movement of the device on its longitudinal axis will bring one or the other of the scraping means into coaction with the resilient wiper, while the movement of the device on its transverse axis will compensate for the difference in the plane or angle of the window glass with respect to the actuating arm.

Another object is to provide means on the actuating arm for securing the device against movement on its longitudinal axis, thereby holding the scraping means out of operation and maintaining the flexible wiper in contact with the window glass.

Another object is to provide certain improvements in the form, construction and arrangement of the several parts, whereby the above named and other objects may be effectively attained.

A practical embodiment of my invention is represented in the accompanying drawings, in which Fig. 1 represents a side elevation of a portion of the actuating arm having my improved cleaning element applied thereto, the parts being shown in the position they assume when the resilient wiper alone is used.

Fig. 2 represents a front elevation of the same.

Fig. 3 represents a horizontal section, on a larger scale, taken in the plane of the line III—III of Fig. 1.

Fig. 4 represents a similar view with the parts in another position, in which position one of the scrapers is brought into coaction with the resilient wiper, and the arm and device arranged to be moved in the direction of the arrow.

Fig. 5 represents a similar view with the parts in another position, the arm and device being shown in the position they assume when moved in the direction of the arrow.

Fig. 6 represents a horizontal section taken in the plane of the line VI—VI of Fig. 1.

Fig. 7 represents a detail side elevation partly in section of a modified form of means for locking the scrapers out of operation.

Fig. 8 represents a horizontal section taken in the plane of the line VIII—VIII of Fig. 7.

Fig. 9 represents a detail side elevation partly in section of another form of means for holding the scrapers in their inoperative position, and Fig. 10 represents a horizontal section taken in the plane of the line X—X of Fig. 9.

The arm is denoted by 1 and it may be either reciprocated or oscillated in a plane parallel to the plane of the window glass 2, by any well known or approved means. The end of the arm 1 is provided with an elongated groove 3, which is arranged to receive a cleaning element comprising a longitudinal channel member 4 having its edges turned outwardly to form scrapers 5, 6 disposed in opposite directions.

A resilient wiper 7 composed of a flat strip of flexible material, such as rubber, is folded to form a hollow contact portion 8, which normally extends outwardly beyond the edges of the scrapers 5, 6. The longitudinal edges of the folded strip are held firmly between the walls of the channel member 4, by pinching or otherwise securing, so that the hollow contact portion will assume a position midway of the edges of the scrapers.

The member 4 is loosely held in and spaced from the bottom of the groove 3 by means of a bolt 9 passed through an elongated slot 10 in the channel member 4 and secured in the wall of the groove 3. By reason of the elongated slot 10 in the channel member 4 and the bolt 9, the member is permitted to oscillate on its longitudinal axis thereby allowing the contact edge of one of the scrapers to move forwardly into the vertical plane of the hollow contact portion 8 of the wiper 7. Upon movement of one scraper forwardly, the other scraper will, of course, move rearwardly of the plane of the wiper.

Thus it will be seen that as the member 4 is rocked only one scraper will be brought into contact with the window glass together with the wiper. The scraper elected to coact with the wiper 7 in contact with the window glass is controlled by the actuation of the arm 1, and the direction of movement of the arm determines the particular scraper to be brought into action. This is accomplished by reason of the fact that at all times the hollow contact portion 8 is frictionally held against the window glass and the first movement of the arm causes one of the walls of the groove 3 to engage the member 4, which in turn rocks the contact portion 8 on the window glass until the advancing scraper strikes the glass.

When the motion of the arm is reversed, the other wall of the groove will be brought into engagement with the channel member 4, and as the member is frictionally held at the contact surface of the portion 8 and window glass, the member will again be caused to rock until the other scraper strikes the glass. It is therefore evident that the movement of the arm 1 and member 4 automatically brings the scraper, which is the forward scraper with respect to the movement of the arm, into coaction with the wiper 7 so that the window glass will first be scraped of any foreign matter, such as snow, sleet and ice, and then wiped free of any moisture by the hollow contact portion 8.

When it is desired to place the scrapers out of operation and only use the flexible wiper 7, I provide means for locking the channel member 4 in the groove 3, which means, shown in Figs. 1 to 5 inclusive, comprises an eccentric cam 11 pivoted at 12 between ears 13 extending outwardly from the arm 1. The cam 11 is manipulated by a handle 14 so that it may be brought into engagement with a plunger 15 arranged to be moved longitudinally in a hole 16 in the arm 1. To lock the channel member against movement on its longitudinal axis, the cam is moved to the position shown in Figs. 1 and 3, in which position the plunger 15 has been caused to engage the contact of the member 4 and force it forwardly so that the rear end of the slot 10 will be pressed against the bolt 9. In this position the channel member cannot move on its longitudinal axis but it may be slightly oscillated on its transverse axis by reason of the curved nose 17 of the plunger 15 which holds the member in its forward position. In addition to the above means for holding the channel member in a relatively fixed position, screws 18 are threaded in the walls of the grooves 3 and arranged to impinge against the sides of the channel member 4 and thereby rigidly hold the member against movement on its longitudinal axis, as clearly shown in Figs. 1 and 6.

To quickly put the scrapers into operation, the screws 18 are withdrawn and the cam 11 manipulated by the handle 14 and thrown to the position shown in dotted outline in Fig. 1. This movement of the cam 11 liberates the plunger 15 so that the channel member 4 may again be allowed to oscillate on the bolt 9 and slot 10 on its longitudinal axis.

In the form shown in Figs. 7 and 8, I provide a cam 19 pivoted at 20 in ears 21 formed on the arm 1, which cam is arranged to move in a slot 22 and engage the channel member 4 to lock the same against movement on its longitudinal axis, thereby holding the scrapers away from the window glass.

When the scrapers are to be used, the cam is swung to the position shown in dotted outline in Fig. 7. In order to allow the member 4 to rock on its transverse axis, the face of the cam 19 is longitudinally grooved at 23 so as to embrace the back of the channel member 4 and allow a certain slight oscillation therebetween.

In the form shown in Figs. 9 and 10, the means for locking the member 4 against movement on its longitudinal axis includes a thumb screw 24 having a threaded engagement with the arm 1 and arranged to be moved into engagement with teat 25 projecting rearwardly on the back of the member 4. The end of the thumb screw 24 is recessed at 26 to receive the teat 25. When the thumb screw 24 is screwed into engagement with the teat 25 the scrapers will be caused to assume the position shown in Fig. 10.

It is to be understood that, in each of the forms shown, the locking means, carried by the actuating arm, is disengaged from the channel member 4, when the channel member is to be rocked on its longitudinal axis by the actuating arm 1.

The resilient wiper 7 and the manner by which it is formed is shown, described and claimed in my copending application Serial No. 74,792 filed December 11, 1925.

It is obvious that various changes may be resorted to in the form, construction and arrangement of the several parts without departing from the spirit and scope of my invention; and hence, I do not intend to be limited to the details herein shown and described except as they may be included in the claims.

What I claim is:

1. A window cleaning device comprising, an arm adapted to be moved in a plane parallel to the window, a cleaning element mounted to oscillate on said arm, said element including oppositely disposed scrapers and a resilient wiper interposed between said scrapers, the contact surface of said wiper normally extending beyond the edges of the scrapers, whereby the movement of the arm will rock the element and bring one of the scrapers into contact with the window glass.

2. A window cleaning device comprising, an arm adapted to be moved in a plane parallel to the window, a cleaning element mounted to oscillate on said arm, said element including oppositely disposed scrapers and a resilient wiper interposed between said scrapers, the contact surface of said wiper normally extending beyond the edges of the scrapers, whereby the movement of the arm will rock the element and bring one of the scrapers into contact with the window glass, and means for securing the element from oscillating on its axis on said arm.

3. A window cleaning device comprising, an arm adapted to be moved in a plane parallel to the window, a cleaning element mounted to oscillate on its longitudinal axis on said arm, said element including oppositely disposed scrapers and a resilient wiper interposed between said scrapers, the contact surface of said wiper normally extending beyond the edges of the scrapers, whereby the movement of the arm will automatically rock the element by reason of the resilient wiper contacting with the window glass and bring one of the scrapers into contact with the window glass.

4. A window cleaning device comprising, an arm adapted to be moved in a plane parallel to the window, a cleaning element mounted to oscillate on its longitudinal and transverse axes on said arm, said element including oppositely disposed scrapers and a resilient wiper interposed between said scrapers, the contact surface of said wiper normally extending beyond the edges of the scrapers, whereby the movement of the arm will automatically rock the element by reason of the resilient wiper contacting with the window glass and bring one of the scrapers into contact with the window glass.

5. A window cleaning device comprising, an arm adapted to be moved in a plane parallel to the window, a cleaning element mounted to oscillate on its longitudinal and transverse axes on said arm, said element including oppositely disposed scrapers and a resilient wiper interposed between said scrapers, the contact surface of said wiper normally extending beyond the edges of the scrapers, whereby the movement of the arm will automatically rock the element by reason of the resilient wiper contacting with the window glass and bring one of the scrapers into contact with the window glass, and means carried by the arm for securing the element from oscillating on its longitudinal and transverse axes on said arm.

6. A window cleaning device comprising, an arm adapted to be moved in a plane parallel to the window, a cleaning element mounted to oscillate on said arm, said element including a longitudinal channel member having oppositely disposed scrapers integrally formed thereon and a resilient wiper disposed in said channel member between said scrapers, the contact surface of said wiper normally extending beyond the edges of the scrapers, whereby the movement of the arm will automatically rock the element by reason of the resilient wiper contacting with the window glass and bring one of the scrapers into contact with the window glass.

7. A window cleaning device comprising, an arm adapted to be moved in a plane parallel to the window, a cleaning element mounted to oscillate on said arm, said element including a longitudinal channel member having oppositely disposed scrapers integrally formed thereon and a resilient wiper disposed in said channel member between said scrapers, the contact surface of said wiper normally extending beyond the edges of the scrapers, whereby the movement of the arm will automatically rock the element by reason of the resilient wiper contacting with the window glass and bring one of the scrapers into contact with the window glass, and means carried by the arm for securing the channel member from oscillating on its axis.

8. A window cleaning device comprising, an arm adapted to be moved in a plane parallel to the window, a cleaning element mounted to oscillate on said arm, said element including a longitudinal channel member having oppositely disposed scrapers formed thereon and a resilient wiper disposed in said channel member between said scrapers, the contact surface of said wiper normally extending beyond the edges of the scrapers, whereby the movement of the arm will rock the element and bring one of the scrapers into contact with the window glass, and means for securing the channel member from oscillating on its axis, said means being carried by the arm and movable toward and away from the channel member.

In testimony, that I claim the foregoing as my invention, I have signed my name this 7th day of April, 1927.

LOUIS HACHENBERG.